F. P. HANSON & H. W. ARNOLD.
STONE SAW.
APPLICATION FILED DEC. 31, 1908.

971,746.

Patented Oct. 4, 1910.

2 SHEETS—SHEET 1.

Witnesses:

F. P. Hanson
H. W. Arnold
Inventors

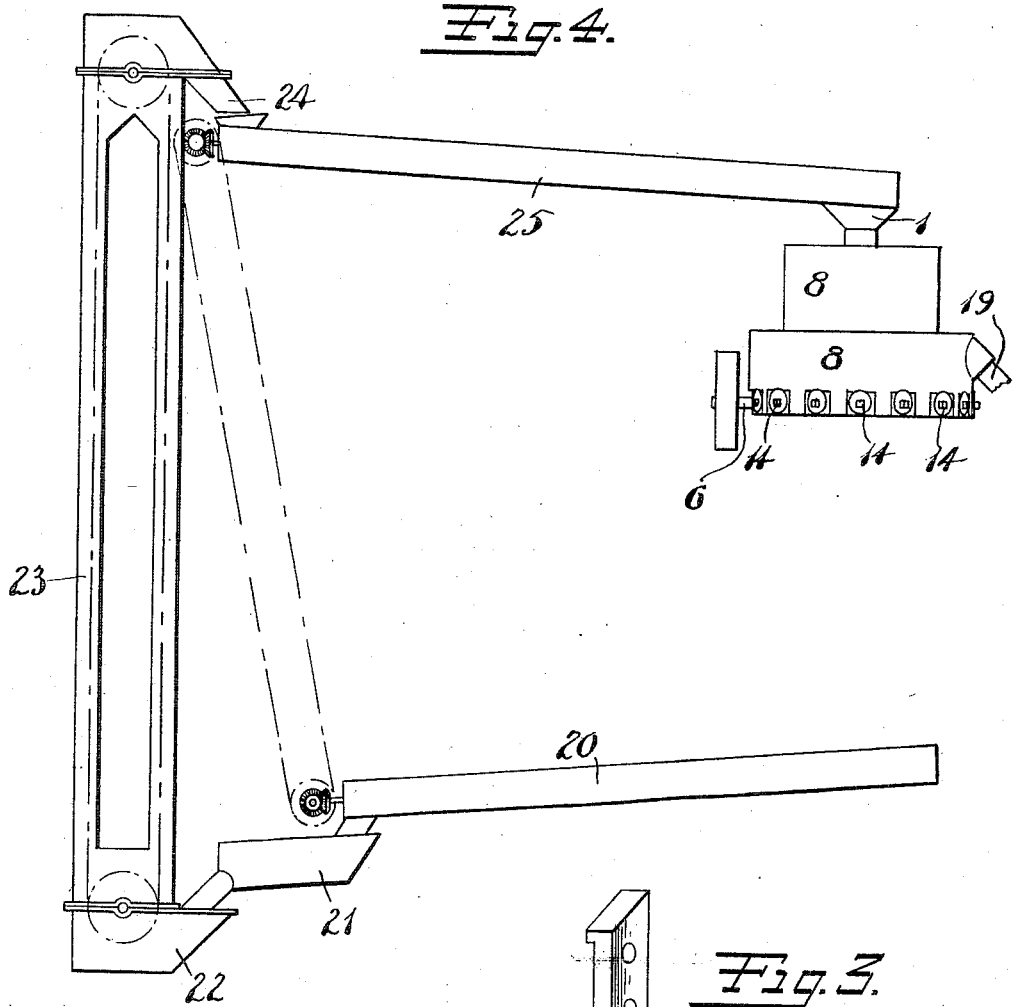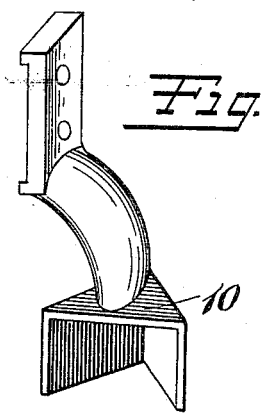

UNITED STATES PATENT OFFICE.

FRED P. HANSON, OF SAN FRANCISCO, AND HENRY W. ARNOLD, OF SACRAMENTO, CALIFORNIA, ASSIGNORS TO THE UNITED STATES STONE SAW COMPANY, OF TUCSON, ARIZONA TERRITORY, A CORPORATION OF ARIZONA TERRITORY.

STONE-SAW.

971,746.   Specification of Letters Patent.   Patented Oct. 4, 1910.

Application filed December 31, 1908.   Serial No. 470,190.

*To all whom it may concern:*

Be it known that we, FRED P. HANSON and HENRY W. ARNOLD, citizens of the United States, residing, respectively, at San Francisco, California, and Sacramento, California, have invented certain new and useful Improvements in Stone-Saws, of which the following is a full, clear, and exact, description.

Our invention relates to improvements in stone sawing machines, and particularly to a means for feeding the abrading material (for example, shot) to feed pipes, which in turn conduct the same to the desired destination.

We have not deemed it necessary to illustrate the saw proper, since it may be understood that this invention relates to and may be applied to any form of stone saw which employs abrading material to assist in the cutting of the stone. The construction is automatic in that the discharged abrasive material may be picked up and re-conveyed to the distributing device by any conventional form of conveying mechanism.

Figure 1:
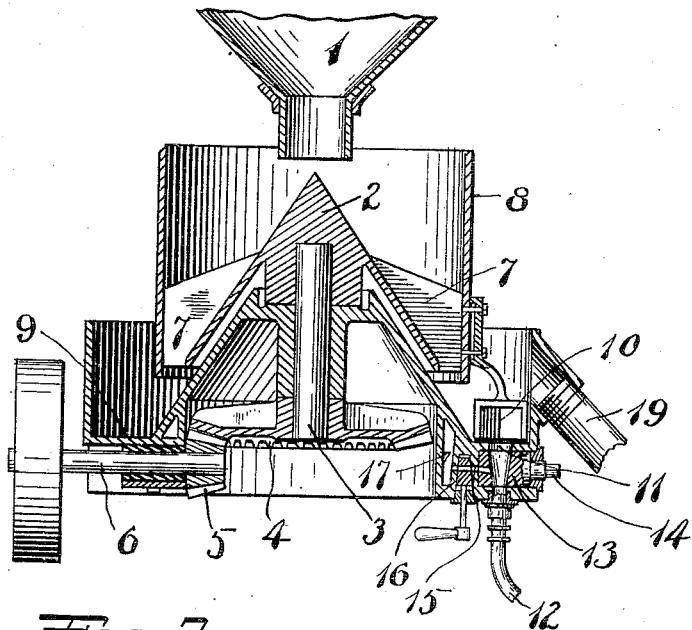
Figure 2:
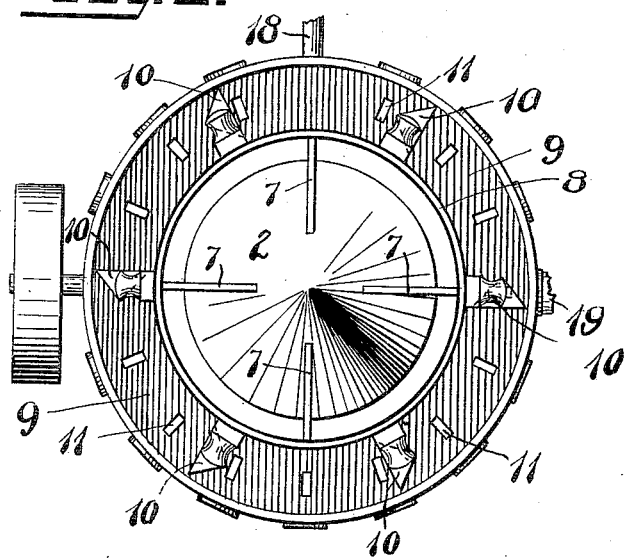

In the drawings Figure 1 is a vertical section in elevation of our improved shot feeding mechanism, Fig. 2 is a plan view, with the hopper removed, Fig. 3 is a perspective view of a detail, Fig. 4 is a diagrammatic view of a conveyer system in combination with my improved shot distributing device, all on a relatively reduced scale.

1 represents a hopper through which shot may be fed onto the apex of a revoluble cone-like member or deflector 2. This cone 2 is driven from any suitable source of power transmitted in any suitable manner, as through a shaft 3.

4, and 5 are bevel gears, the latter being mounted upon what may represent a power shaft 6, suitable bearings being provided for all said wheels and shafts. The cone is provided with the vertical ribs 7—7.

8 is a ring surrounding the cone 2 and connected thereto by the ribs 7, the lower end of said ring being spaced away from the cone 2 to provide an opening to permit the shot sliding down the cone 2 to find an outlet. Surrounding this outlet is a trough 9 of annular form, having by preference a flat floor near its periphery. The ring 8 is preferably integrally connected with the ribs 7—7 although it may be attached thereto in any desired manner, so that as the cone revolves, the ring 8 will revolve with it and with said ribs 7—7.

10 is a stirrer carried by the ring 8, said stirrer traveling around in the annular trough referred to. Any desired number of these stirrers may be provided, six being indicated in Fig. 2. The stirrers 10, 10 are preferably constructed as indicated in the perspective view, Fig. 3, so as to have two flared faces tending to collect and centralize any shot that may be picked up in the path of the stirrer, whereby said shot will be swept over suitable outlets 11—11 from each of which may lead a distributing pipe 12. To describe the construction of a single valve mechanism employed in connection with one of these pipes will be sufficient.

Between the outlet at the bottom of the trough and the entrance end to the outlet or distributing pipe 12, is a valve 13, which has a passage therethrough of a shape corresponding to said outlet passage. This valve has an exposed squared end 14 whereby it may be manipulated. By partially turning this valve the passage therethrough may be contracted or reduced to any desired degree, or, by turning said valve at right angles to the position shown in Fig. 1, the outlet to any particular distributing pipe may be entirely cut off. Entering centrally at one end of the valve 13 is a duct 15 controllable by a manually operable valve 16, said duct passing through said valve and into a water jacket or space 17 supplied with water through a pipe 18.

19 is an overflow communicating with the annular trough 9, whereby if an excess of material of any sort gets into said trough it will overflow before any damage can be done.

In practice, the abrasive material fed from the hopper 1 falls upon the apex of the cone 2. It is then divided so as to flow in all directions with substantial uniformity, and is guided between the ribs 7 so as to be discharged into the annular trough with substantial uniformity entirely around the same. The stirrers 10 cause the abrasive material to be advanced over the respective discharge outlets through which said material falls, in a quantity determinable by the adjustment of the valve 13. At or adjacent this point, as shown, a suitable quantity of water is let in with the abrasive material, the particular quantity being determinable by the adjustment of valve 16. By means of these valves, the proper relative proportion of abrasive material and water may be determined and modified to suit the particular needs. The distributing pipes (one illustration of which is indicated at 12) are preferably flexible, whereby the discharge end of each may be directed to the proper destination for the abrasive material, this, of course, varying with the particular saw to which the abrasive material is supplied. By this arrangement manual labor is practically eliminated, since mechanical conveyers can take the usual abrasive material up after it is discharged from the saw cuts or kerfs in the stone and convey it back to the hopper 1. As such conveyers (broadly speaking) are well known, and as it is possible to design a great variety of the same, we have illustrated herein only one form conventionally.

In Fig. 4, 20 is a large inclined receiving trough arranged to stand below the stone sawing machine (not shown). This trough may be provided with a suitable power-driven agitator to cause the abrasive material to flow by gravity down to a separator trough 21, the bottom of which may be provided with a screen to permit uselessly fine abrasive material to be discharged and with an outlet for useful material. The useful abrasive material passes into a trough 22, where it is taken up an elevator chute 23 and discharged through chute 24 into a gutter 25 having a suitable agitator or conveyer leading back to hopper 1.

What we claim is—

1. In a distributing device for abrasive material for stone sawing machines and the like, an annular gutter or trough having outlets, and a revoluble distributer for distributing abrasive material around the same, said distributer including a cone deflector centrally mounted relatively thereto.

2. In a distributing device for abrasive material for stone sawing machines and the like, an annular gutter or trough having outlets, and means for distributing abrasive material around the same, including a cone deflector centrally mounted relatively thereto, and vertical ribs on said cone and a ring carried by said ribs and spaced away from said cone.

3. In a distributing device for abrasive material for stone sawing machines and the like, an annular gutter or trough having outlets, and means for distributing abrasive material around the same, including a cone deflector centrally mounted relatively thereto, and a ring carried by said cone but spaced apart from the lower end thereof at a point above said trough.

4. In a device of the character described, an annular trough having valved outlet passages, means for supplying liquid to said passages, and a valve control therefor.

5. In a machine of the character described, an annular trough, means for supplying abrasive material thereto, means for moving the abrasive material in said trough around the same, outlets from said trough, a water supply means, valves for said outlets and a valve for said water supply.

6. In a machine of the character described, an annular trough, means for supplying abrasive material thereto, means for moving the abrasive material in said trough around the same, outlets from said trough, a water supply means, a valve for said outlet, and a valve for said water supply, the last mentioned valve being arranged in a passage extending into the first mentioned valve and communicating with the passage therein.

7. In a machine of the character described, an annular trough having outlets, valves for controlling the same, valved means for supplying liquid to said outlets, means for supplying to said trough with substantial uniformity around the same a quantity of abrasive material, and means for advancing the abrasive material in said trough over said outlets.

FRED P. HANSON.
HENRY W. ARNOLD.

Witnesses:
ROBERTSON T. MCKISICK,
ALMA E. GRADY.